Aug. 6, 1968          D. R. DONOVAN          3,395,875
WIRELESS WINGTIP LIGHTS FOR ROTARY WING AIRCRAFT
Filed Oct. 22, 1965
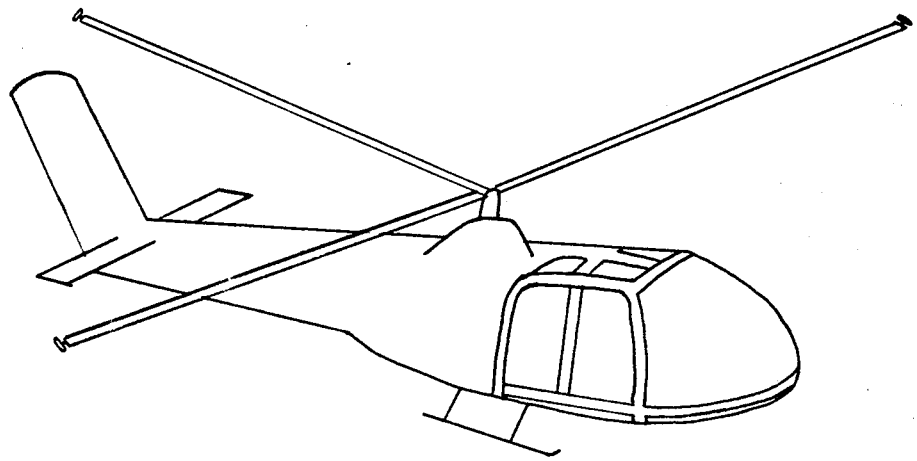
Fig 1
Fig 2
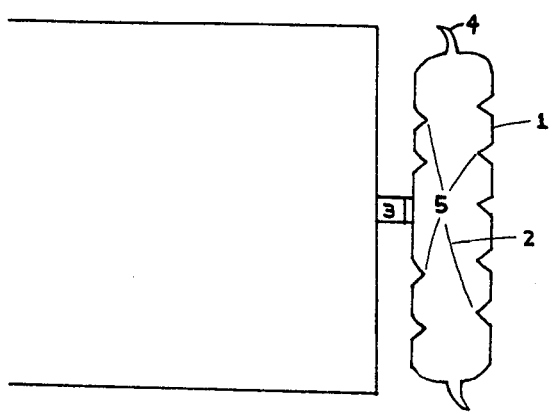
Inventor
Daniel R. Donovan 3,395,875
WIRELESS WINGTIP LIGHTS FOR ROTARY WING AIRCRAFT
Daniel R. Donovan, 70C Freemont St., Bloomfield, N.J. 07003
Filed Oct. 22, 1965, Ser. No. 502,267
1 Claim. (Cl. 244—17.11)

ABSTRACT OF THE DISCLOSURE

A radiant energy light source adapted to be mounted on the tips of a rotary wing aircraft by a rotary mounting means, said light source comprising a hermetically sealed envelope having its walls coated with phosphor, containing a mixture of inert gas and mercury, the envelope having a plurality of projections on the inside wall and extending into the interior of the envelope and a plurality of blades formed on the envelope to enable the envelope to be rotated by air currents to agitate the mixture of gas and mercury to cause static charges which ionize the gas to produce visible light.

---

This invention relates to aircraft lighting devices and is particular to lighting devices suitable for use with rotary wing aircraft.

It has long been desired to provide rotary wing aircraft with lights at its extremeties as is done with conventional wing aircraft. No particular problems arise in providing lights on the wings of conventional aircraft since they are rigidly constructed and the lighting devices themselves are subjected to no more strain or pressure than the remainder of the aircraft.

With rotary wing aircraft it is desirable to have lights at the tips of the rotary wing blades. However, lights cannot be connected in a normal manner since there is a high rotational force at the wing tips with attendant damaging effects, and because the wing blades must be prepared for rotational movement from the main body of the aircraft. Thus the high centrifugal forces at the rotary wing blade tips destroy normal lighting apparatus. Further it is extremely difficult to supply current from a central source to the blade tips. These problems are further complicated in rotary wing aircraft wherein contra-rotating rotors are provided.

The present invention contemplates a rotary wing lighting designed to overcome the disadvantages of the prior art. One feature of the device is that it is completely self containing and needs no external power source to produce light. A transparent envelope is filled with an inert gas and quantity of mercury and coated with a photoluminescent material. The mercury produces electrostatic charges when agitated, which in turn ionizes the gas and photoluminescent material producing visible light.

Another feature of the invention is the provision of an envelope configuration and mounting means which will insure uniform distribution of gas and mercury within the envelope and which will not be affected by the high gravitational force at the blade tip.

Other features include indefinite life of the lighting device and freedom from maintenance.

FIGURE 1 shows the present invention attached to a rotary wing blade.

FIGURE 2 is a more detailed view of the lighting device.

The improved lighting device, generally indicated by 1, coinsists of an enclosed transparent envelope 2 of glass, plastic, or similar material. The envelope 2 is provided with a supporting shaft 3 integrally attached to the envelope 2. The supporting shaft 3 may be molded on the envelope 2 and is designed for rotational movement about its axis.

To facilitate the rotational movement about the axis of the supporting device 3 the envelope 2 is provided integrally molded on fins or blades 4. Thus the lighting device 1 is spun around on the axis of the supporting shaft 3 much like a pinwheel or propellor through the action of air currents with the blades 4.

The envelope 2 is constructed so projections 5 are formed facing the interior. A preferable method of forming the projections 5 is to force portions of the envelope 2 into its interior when in a heat softened condition by pushing in the outside of the envelope 2 structure. Alternately the envelope 2 may be formed with preformed glass or plastic rods. No particular form or geometric pattern is necessary for these projections 5 since they will operate in a satisfactory manner as herein below described, as long as they project into the interior of the envelope 2.

A mixture of mercury and inert gas such as neon, argon or xenon is placed within the envelope 2 which is partially exhausted to reduce the pressure and hermetically sealed. Because of the low pressure, the mercury partially vaporizes until an equilibrium is reached wherein the envelope 2 contains inert gas and mercury in a liquidous and vapor phase.

The operation of the device is as follows. The lighting device 1 is caused to spin on the supporting shaft 3 about its axis by the agitation and air currents caused by external forces such as by a moving rotor blade. This spinning causes the liquid mercury within the envelope 2 to be thrown about over the inside projections 5. This frictional energy caused by the mercury flowing rapidly over the inside projections 5 produces static charges. When these charges in turn discharge, they ionize the inert gas thereby producing light in the visible wave length spectrum.

The light produced can be controlled or amplified by coating the envelope 2 with photoluminescent materials designed to produce fluorescence at a particular wave length. In this manner intensity and color can be changed.

It will be apparent that although the invention has been described in connection with a helicopter, it is not so limited, and is equally applicable where light is desired free of electrical wiring connections. For example the lighting device of this invention could be used on automobile hub caps. It also could be used on the masts of small boats where the motion of the sea and wind would effect the operation.

Obviously, numerous modifications and variations of the present invention are possible in the light of the above techniques. It is therefore to be understood that within the scope of the appended claim, the invention may be practiced otherwise than as specifically described herein.

What is claimed is:

1. In combination with a rotary wing aircraft, a plurality of rotary wings, a source of radiant energy mounted on the tips of said wings, a rotatable mounting means adapted to rotatably attach said source of radiant energy to said rotary wings, said source of radiant energy comprising a hermeticalliy sealed envelope containing a mixture of inert gas and mercury, the walls of said envelope being coated with phosphor, said envelope including a plurality of projections formed integral with the inside wall of said envelope and extending into the interior of said envelope and a plurality of blades formed on the ends of said envelope adapted to coact with air currents produced by rotation of said rotary wings to rotate said envelope on said rotatable mounting means to agitate the mixture of gas and mercury causing static charges which ionize the gas to produce visible light.

References Cited

UNITED STATES PATENTS

| 2,449,880 | 9/1948 | Cox | 313—109 |
| 3,090,977 | 5/1963 | Murray | 313—108 X |
| 3,174,552 | 3/1965 | Soucy | 240—7.7 X |

JAMES W. LAWRENCE, *Primary Examiner.*

P. C. DEMEO, *Assistant Examiner.*